United States Patent [19]

Cameron

[11] Patent Number: 4,717,092

[45] Date of Patent: Jan. 5, 1988

[54] TORPEDO RECOVERY DEVICE

[76] Inventor: Robert W. Cameron, 7724 115th Pl. NE., Kirkland, Wash. 98033

[21] Appl. No.: 815,915

[22] Filed: Jan. 3, 1986

Related U.S. Application Data

[63] Continuation-in-part of Ser. No. 792,543, Oct. 29, 1985.

[51] Int. Cl.$^4$ ............................................. B64B 1/50
[52] U.S. Cl. .................................... 244/33; 441/23; 441/30; 441/7; 116/210
[58] Field of Search .......... 244/37, 31, 24, 29, 244/30; 441/21, 23, 29, 33, 30, 7, 9, 2, 41, 90, 31; 116/210; 114/20.1, 333

[56] References Cited

U.S. PATENT DOCUMENTS

| | | |
|---|---|---|
| 2,752,615 | 7/1956 | Parker ............................ 441/30 |
| 2,867,799 | 1/1959 | Decarie . |
| 2,966,674 | 12/1960 | Clark . |
| 2,999,657 | 9/1961 | Clark . |
| 3,003,722 | 10/1961 | Pohl . |
| 3,088,136 | 5/1963 | Kauffman et al. ................ 441/7 |
| 3,123,842 | 3/1964 | Oeland, Jr. et al. .............. 441/9 |
| 3,154,050 | 10/1964 | Hanson . |
| 3,175,525 | 3/1965 | De Vreis ...................... 114/20.1 |
| 3,253,573 | 5/1966 | Ashline . |
| 3,270,895 | 9/1966 | Stewart . |
| 3,279,419 | 10/1966 | DeMarco . |
| 3,395,877 | 8/1968 | MacFadden et al. . |
| 3,487,810 | 1/1970 | Clement ........................ 441/30 |
| 3,521,836 | 7/1970 | Struble, Jr. . |
| 3,592,157 | 7/1971 | Schwartz . |
| 3,616,569 | 6/1972 | Litt et al. . |
| 3,721,983 | 3/1973 | Sherer . |
| 3,791,611 | 2/1974 | Babbidge . |
| 3,796,181 | 3/1974 | Collins . |
| 3,951,260 | 4/1976 | Frazee . |
| 4,029,273 | 6/1977 | Christoffel, Jr. . |
| 4,042,882 | 8/1977 | Camacho et al. . |
| 4,044,711 | 8/1977 | Jamison . |
| 4,094,267 | 6/1978 | Davis, Jr. . |
| 4,120,259 | 10/1978 | Wilson . |
| 4,433,638 | 2/1984 | Ashline ........................ 441/7 |
| 4,533,099 | 8/1985 | Stewart . |
| 4,586,456 | 5/1986 | Forward . |

Primary Examiner—Joseph F. Peters, Jr.
Assistant Examiner—Lynn M. Fiorito
Attorney, Agent, or Firm—Seed and Berry

[57] ABSTRACT

A torpedo recovery unit positionable within a torpedo casing having an opening for receiving the unit. The unit includes a body with an interior cavity having an open end mountable within the torpedo casing with the open end at the torpedo casing opening. The body is rigidly supported within the torpedo casing. A non-rigid, gas-inflatable airfoil is foldable within the body cavity for deployment therefrom upon inflation. A bottle containing pressurized helium is rigidly and removably attached to the body. A release valve on the bottle releases the pressurized gas on depression. A valve member is rigidly attached to the body. A first end portion extends through the body end wall and projects into the body cavity and has an inflation needle mounted thereof for inflation of the airfoil. A valve member has a second end portion positioned outside of the body and operatively engaging the release valve when the bottle is attached to the body. An interior gas passage between the second end portion and the inflation needle has gas flow control by a solenoid-operating valve. A reel is positioned within the body cavity and is coaxially and rotatably mountable upon a valve member first end portion. The reel has a tether line wrapped thereabout with one end attached to the airfoil. A lid is positioned at the body open and is outwardly opening under the force applied thereto by the airfoil during inflation.

13 Claims, 7 Drawing Figures

TORPEDO RECOVERY DEVICE

This is a continuation-in-part of application Ser. No. 792,543, filed Oct. 29, 1985 entitled "Inflatable Airfoil".

DESCRIPTION

1. Technical Field

The present invention relates to a torpedo recovery device, and more particularly, to a device positionable within an unmanned torpedo casing and self-actuating to assist in location and recovery of unmanned torpedos.

2. Background of the Invention

The torpedos currently used by the military are sophisticated and expensive weapons, and when test fired for practice, quality assurance or experimentation, it is desirable to recover the torpedo. Since torpedos are unmanned craft, it is necessary that any device which assists in location and recovery of the torpedo be entirely self-actuating.

Simple balloons filled with helium have been considered to assist in location of torpedos at the end of their run, however, their flight characteristics are less than desirable. While a conventional balloon filled with helium will rise vertically in situations where there is no wind, even a slight wind is often enough to cause them to blow downwind and loose altitude. As such, they are not as visible to a searcher and high winds can blow the balloon completely down to the surface level. Moreover, if released from under the water, such as it necessary when in use as a signal device for location and recovery of a submerged torpedo, a balloon will many times not exit the water. As such, it is proven necessary to employ an improved airfoil such as described in my co-pending application referenced above. The present invention is directed toward a torpedo recovery device for deploying such an airfoil.

Upon receiving an electrical signal from the torpedo that the run is finished and recovery necessary, the torpedo recovery device should automatically deploy and inflate the airfoil. Moreover, the recovery device should play out the tether line attached to the airfoil and allow it to rise vertically above the torpedo. The airfoil should fly in wind conditions from flat calm to 20 knots or more while remaining aloft over the torpedo at an altitude of 60 to 75 feet. The airfoil should be inflated in a minimum amount of time.

The recovery device should be compact and have a place for stowage of the deflated airfoil. The airfoil and tether line mechanism should be disposable parts and easily replaced for the next firing of the torpedo. Moreover, the source of helium gas should also be easily refilled once expended to fill the airfoil. The torpedo recovery device should have an unusually long shelf life when in a condition pressure charged with helium so that the recovery device remains operable even after long storage periods.

The present invention fulfills these needs and further provides other related advantages.

DISCLOSURE OF THE INVENTION

The present invention resides in a torpedo recovery unit positionable within a torpedo casing. The unit includes a body with an interior cavity having an open end mountable within the torpedo casing. The body is insertable into the opening in the torpedo casing with the body open end at the casing opening. The body is rigidly supportable within the torpedo casing. In the preferred embodiment of the invention the body is attachable to the torpedo casing by a flange at the open end which is received in an annular recessed lip of the casing opening. A non-rigid, gas inflatable airfoil is foldable within the interior body cavity for deployment therefrom upon inflation.

The unit further includes a bottle containing pressurized gas rigidly and removably attached to the body within the torpedo casing. The bottle is positioned generally coaxial with the body and has a release valve for release of the pressurized gas therein upon depression of the release valve.

A valve member is rigidly attached to the body and has a first end portion extending through an aperture in the body. The first end portion projects into the interior body cavity and has an inflation needle for inflation of the airfoil. The valve member further has a second end portion positioned outside of the body and operably and sealably engaging the release valve when the bottle is attached to the body.

The valve member has an interior gas passage extending between the second end portion and the inflation needle at the first end portion with gas flow therethrough being controlled by a solenoid-operated valve. The passage to the bottle side of the valve member is charged with pressurized gas from the bottle upon attachment of the bottle to the body. The solenoid valve is selectively operable to open the passage to allow flow of pressurized gas to the inflation needle for inflation of the airfoil.

A reel is positioned within the interior body cavity and is coaxially and rotatably mounted on the valve member first end portion. The reel has a tether line wrapped thereabout with one end attached to the airfoil. The reel is substantially free to play out the tether line upon deployment of the airfoil from the interior body cavity under the pulling force applied to the tether line by the airfoil when inflated.

A lid is positioned at the body open end and releasably engages the body. The lid is outwardly opening under the force applied to an inward side thereof by the airfoil during inflation.

A selectively operable flood valve in the body allows release of water in the body cavity into the interior of the torpedo casing for selective flooding of the torpedo casing.

Other features and advantages of the invention will become apparent from the following detailed description, taken in conjunction with the accompanying drawings.

BEST MODE FOR CARRYING OUT THE INVENTION

As shown in the drawings for purposes of illustration, the present invention is embodied in a torpedo recovery unit 10. The unit 10 is positionable within a torpedo casing 12 of a torpedo, shown in FIG. 2 having a substantially circular cross-section. The casing 12 has a circular sidewall opening 14 with an annular externally recessed lip 16 for receiving the unit.

Figure 2:
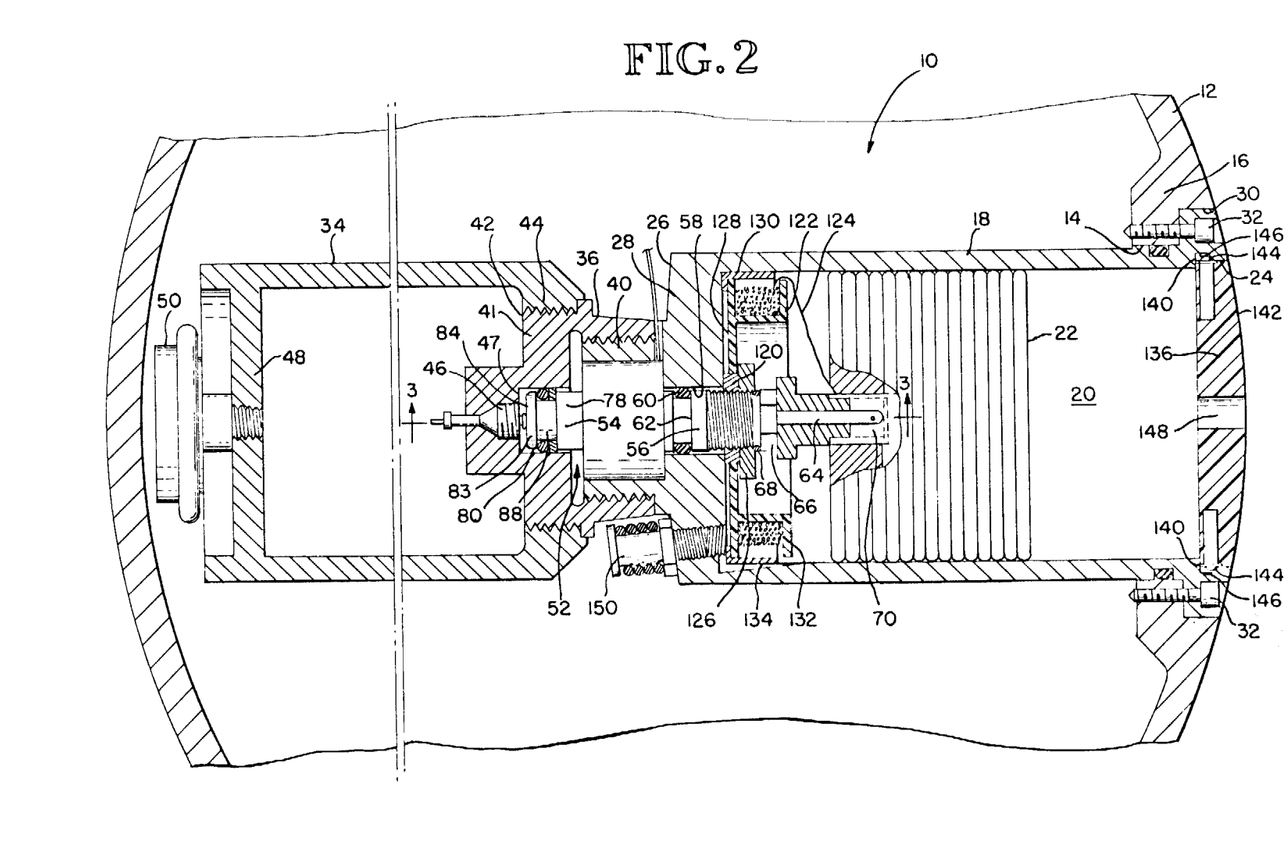
FIG. 2 is a longitudinal cross-sectional view of the torpedo recovery device of the present invention shown installed in a torpedo casing.

The torpedo recovery unit 10 includes a substantially cylindrical body 18 with an interior cavity 20 for stowage in a folded manner of a non-rigid, gas-inflatable airfoil 22. As will be described in more detail below, the airfoil is deployable from the body interior cavity 20 upon inflation.

The body 18 is substantially diametrically mountable within the torpedo casing 12, and is inserted into the circular opening 14 in the torpedo casing with an open end 24 of the body 18 at the casing opening. The body 18 has a closed end 26 distant from the open end 24 and positioned within the interior of the torpedo casing 12. The end 26 is closed by an end wall 28.

The body 18 is attached to the torpedo casing 12 by a radially outward projecting annular flange 30 at the open end 24 of the body. The flange 30 is seated in the annular recessed lip 16 of the torpedo casing 12 and is sized to provide a substantially non-protruding exterior mounting so as to not disturb the smooth profile of the torpedo casing. The flange 30 is attached to the lip 16 by a plurality of circumferentially spaced, removable fasteners 32 to rigidly support the torpedo recovery unit 10 within the torpedo casing and to permit access to the interior body cavity 20 of the body 18 when in place in the torpedo casing.

A substantially cylindrical bottle 34 containing pressurized helium gas in sufficient quantity to fully inflate the airfoil to the desired pressure is positioned within the torpedo casing 12 generally coaxial with the body 18. The bottle 34 is rigidly and removably attached to an exterior side of the body closed end wall 28 by an annular threaded female bottle coupler 36. A corresponding annular threaded male body coupler 40 is rigidly attached to the exterior side of the body closed end wall 28 and extends axially toward the bottle 34 to threadably receive the bottle coupler 36 thereon. The bottle coupler 36 is rigidly attached to a threaded cap plug 41 which is threadably received by an interiorly threaded aperture 42 in a head portion 44 of the bottle 34.

The bottle cap plug 41 carries a coaxially positioned conventional Schraeder-type release valve 46 positioned within cylindrical recess 47 in the cap plug. The release valve 46 releases the pressurized gas in the bottle 34 upon depression of the release valve. At an opposite end 48 of the bottle 34 is mounted a pressure gauge 50. It is noted that the pressure gauge is provided so that the pressure of the gas in the bottle 34 may be visually read prior to insertion of the torpedo recovery unit 10 into the torpedo casing 12. When in place within the torpedo casing, the gauge is not visible.

Figures 3, 3A:
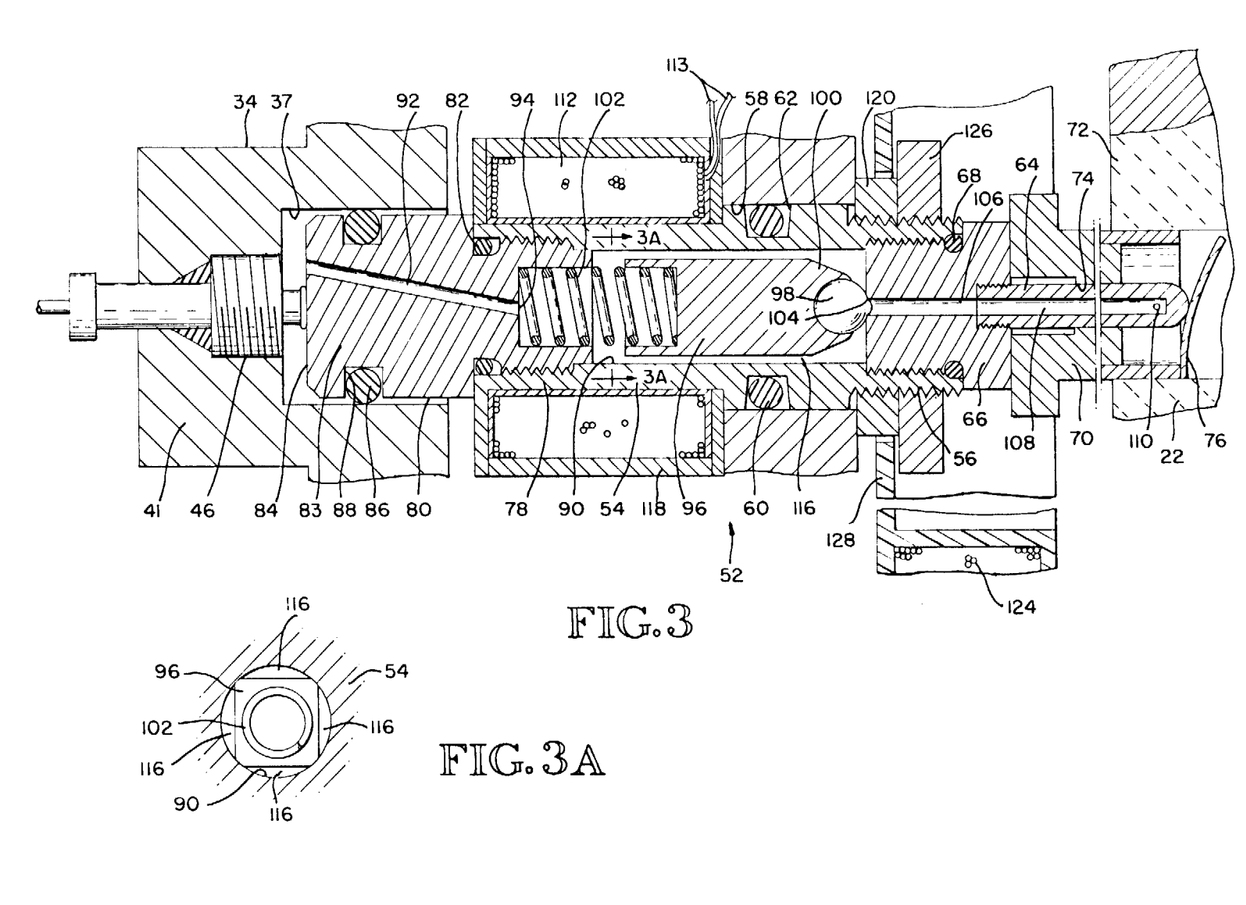
FIG. 3 is an enlarged, fragmentary sectional view of the solenoid valve mechanism taken substantially along the line 3—3 in FIG. 2.
FIG. 3A is a sectional view taken substantially along the line 3A—3A of FIG. 3.

The torpedo recovery unit 10 further includes an elongated valve member, generally indicated by reference numeral 52, and shown in detail in FIG. 3. The valve member 52 is positioned generally coaxial with the body 18 and the bottle 34, and extends through the central opening of the annular coupler 40. The valve member 52 has a cylindrical valve body 54 formed of nonferrous material. A first end portion 56 of the valve body 54 extends through an aperture 58 in the center of the body end wall 28, and an "O"-ring 60 is received in an interior groove 62 to provide a fluid-tight seal between the valve body and the end walls to prevent the flow of water from the interior body cavity 20 into the interior of the torpedo casing 12.

The first end portion 56 extends beyond the body end wall 28 into the interior body cavity 20 and has an inflation needle 64 threadably attached thereto by a threaded base plug 66 to which the needle is threadably attached to an outward side thereof. An "O"-ring 68 is positioned between the base plug 66 and the first end portion 56 of the valve body 54 to prevent the loss of pressurized helium from within the valve body and the flow of water into the valve body.

The inflation needle 64 is insertable into a cylindrical inflation block 70 attached to a forward end neck portion 72 of the airfoil 22. The inflation block 70 has an interior aperture 74 sized to sealably receive the needle for inflation of the airfoil 22. A one-way flap valve 76 is provided in the neck portion 72 of the airfoil, inward of the inflation block 70, and is opened by the inflation needle 64 pressing inward against it. Upon removal of the inflation needle, the one-way flap valve closes and prevents the flow of helium from the airfoil. As the airfoil 22 expands and nears full inflation, generally all but the forward end neck portion 72 and adjacent portions of the airfoil will have exited the body 18. As the airfoil continues to inflate, it tends to interact with the body sidewalls and provide a force which pulls the inflation block 70 free from the needle for automatic release of the airfoil. To accomplish this the body 18 has a diameter significantly less than the airfoil width.

The valve body 54 further has a second end portion 78 positioned outside the body 18 and extending toward the gas bottle 34. The second end portion 78 of the body 54 threadably receives a second end plug 80. An "O" ring 82 is provided between the second end plug 80 and the second end portion 78 to prevent the leakage of any pressurized helium form within the valve body 54. The second end plug 80 has a head portion 83 with an outward face 84 positioned to operatively depress the bottle release valve 46 when the bottle is threadably attached to the body using couplers 36 and 40. The head portion 83 of the plug 80 extends into the cylindrical recess 47 and an "O"-ring 88 is received in an exterior groove 90 to provide a gas-tight seal between the plug head portion of the second plug 80 and the interior walls of the recess.

The valve body 54 of the valve member 52 has an interior chamber 90 which permits selective passage of gas between the bottle 34 and the airfoil 22. A gas passage 92 is provided in the second plug 80 and extends from an opening in the outward side 84 of the plug positioned off-center so as not to be blocked by the release valve 46 when depressed, to an opening 94 in an interior end wall 94 of the plug which communicates with the valve body interior chamber 90. As noted above, when the bottle 34 is attached to the body 18, the outward face 84 of the plug head portion 83 depresses the release valve 46 and pressurized gas is released. Since the "O"-ring 86 prevents any leakage of gas from the recess 47, the gas passes through the passage 92 to the body interior chamber 90. As will be described below, this places the valve 52 in a gas-charged condition.

Slidably disposed within the body interior chamber 90 is a plunger 96 formed of ferrous material and having a Teflon TM ball 98 mounted at an end 100 toward the inflation needle 64. A coil spring 102 is positioned within the chamber 90 between the plunger 96 and the second end plug 80 to bias the ball 98 into sealing engagement with a highly polished centrally positioned seat 104 formed on an interior end wall of the base plug 66 at the first end portion 56 of the valve body 54. By the use of the precision size, Teflon TM material for the ball 98 and a highly polished stainless steel seat 104, the Teflon TM can deform under pressure to tightly fit against the seat and provide an almost leak-free seal. When the ball is withdrawn from the seat, the Teflon TM has a memory quality which allows it to assume its original undeformed shape so that when again moved into the seated position it may again deform to provide another leak-free seal.

A gas passage 106 is provided in the base plug 66 which extends from the seat 104, whereat it communicates with the interior chamber 90 of the valve body 54, to an axial gas passage 108 in the inflation needle 64. The passage 108 in the inflation needle 64 terminates in a laterally opening aperture 110 toward the end of the inflation needle which is inserted into the inflection block 70 of the airfoil 22. When the release valve 46 is depressed, as bottle is attached to the body 18, the interior chamber 90 of the valve body 54 is pressurized with helium. Since the plunger 96 is biased by the spring 102 to seat the ball 98 in the seat 104, no gas passes into the airfoil 22. The pressurized gas in the body interior chamber 90 is released to fill the airfoil 22 upon actuation of a solenoid coil 112 which is wrapped around the exterior of the valve body 54. When an electrical signal is received on the lead wires 113 of the solenoid coil 112 indicating the end of a torpedo run and the time at which it is desired to deploy the airfoil 22, the solenoid coil is electrically activated and causes an electro-magnetic force on the plunger 96. The force moves the plunger away in an axial direction from the base plug 66 and unseats the ball 98 from the seat 104.

The plunger 96 has a square cross-sectional shape with round corners which slidably engage the sidewall of the interior chamber 90 and provide gas passages 116 exterior of the plunger and extending lengthwise to permit gas to flow around the plunger to the end of the plunger toward the base plug 66 (see FIG. 3A). The passages 116 are defined by the space between the plunger and the interior chamber sidewall. When the solenoid coil 112 is activated to move the plunger 96 away from the base plug 66, the charged gas within the interior chamber 90 of the valve body 54 is permitted to pass around the plunger and into the gas passage 106 in the base plug and the gas passage 108 of the inflation needle 64 for inflation of the airfoil 22 which has been pre-positioned with its inflation block 70 on the needle.

The valve member 52 is held in place against movement toward the body 18 by engagement of an exterior case 118 extending around the solenoid coil 112 against the body end wall 28. Movement of the valve member 52 toward the bottle 34 is prevented by a circular attachment nut 120 positioned within the interior cavity 20 of the body 18 and threadably attached to the first end portion 56 of the valve body 54 which extends into the interior body cavity.

A reel 122 is positioned within the interior body cavity 20 between the body closed end wall 28 and the airfoil 22. The reel has a tether line 124 wrapped thereabout with one end attached to the airfoil 22. The reel 122 is coaxially and rotatably mounted on the first end portion 56 of the valve member 54 and is retained in position thereon by a circular retainer nut 126 threadably received on the first end portion outward of the attachment nut 120. The retainer nut 126 is held spaced apart from the end wall 28 by the attachment nut 120. The attachment nut 120 and retainer nut 122 each have radial grooves on at least one face to receive a spanner wrench for turning of the nuts.

The reel 122 is a flanged-type spool with a radially inward projecting flange 128 having a central aperture of a diameter sufficient to be positioned around the attachment nut 120 for free rotation. The flange 128 is axially positioned between the body closed end wall 28 and the retainer nut 126. The retainer nut 126 has a diameter sufficient to extend beyond the attachment nut 120 and overlay the flange 128 to rotatably retain the reel 122 in position. With this arrangement, the reel is substantially free to play out the tether line 124 upon deployment of the airfoil 22 form the body interior cavity 20 under the pulling force applied to the tether line by the airfoil when inflated.

The reel 122 has a radially outward opening channel defined by a pair of spaced-apart radially outward extending circumferential flanges 130 and 132. The channel is sufficiently large to hold 60 to 75 feet of nylon cord, as desired, which serves as the tether line 124. It is noted that the flange 130 is positioned toward the body closed end wall 28 coplanar with the inwardly extending retainer flange 128. The reel further includes a collar 134 circumferentially extending around the channel and attached to the flange 130. The collar 134 extends axially toward the other flange 132 positioned away from the body end wall 28 to define a circumferentially extending space between the collar and the flange 132 through which the tether line may pass as it is played out from the reel. The collar helps retain the line on the reel even if the outward wraps of the line become loose.

The torpedo recovery unit 10 is provided with a fully removable lid 136 covering the open end 24 of the body 18. An inward face 138 of the lid rests against a circumferentially extending stop shoulder 140 formed on the interior sidewall of the body 18 at the open end 24. The stop shoulder 140 engages the lid 136 and prevents inward movement thereof under the water forces encountered during torpedo travel and holds the lid positioned so that an exterior curved surface 142 of the lid has a substantially flush mounting with the exterior of the torpedo casing 12. The lid 136 is releasably held in place during operation of the torpedo, prior to deployment of the airfoil 22, by a plurality of spring-loaded balls 144 circumferentially spaced about the perimeter edge of the lid. The balls 144 are biased outward to engage a circumferentially extending groove 146 on the interior sidewall of the body 18 outward of the stop shoulder 140.

The spring-loaded balls 144 retain the lid 136 in a position closing the interior body cavity 20 of the body 18 until the airfoil 22 is inflated sufficiently to apply an outwardly directed force on the inward surface 138 of the lid which is sufficient to pop the lid outwardly and free of the torpedo casing 12. Once the lid 136 is released, the airfoil 22 is free to further inflate and exit the interior body cavity 20. When fully inflated to a preselected inflation pressure, the airfoil pulls free of the inflation needle 64 and fully exits the interior body cavity 20. As previously noted, the tether line 124 is attached to the airfoil 22 and is free to play out of the reel 122 as the airfoil travels away form the torpedo due to its buoyancy, the lighter-then-air helium gas within the airfoil, and the positive lift the airfoil has when exposed to wind.

Figure 1A:
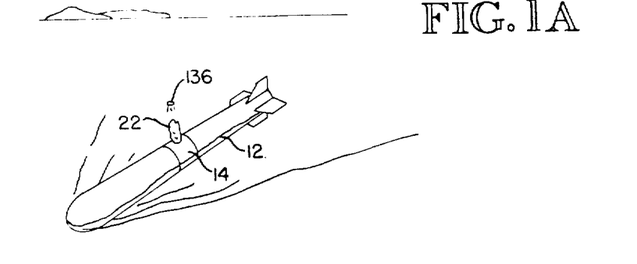
FIGS. 1A, 1B, 1C and 1D show the sequential steps of deploying an airfoil using the torpedo recovery device of the present invention mounted in a torpedo.
Figures 1B, 1C, 1D:
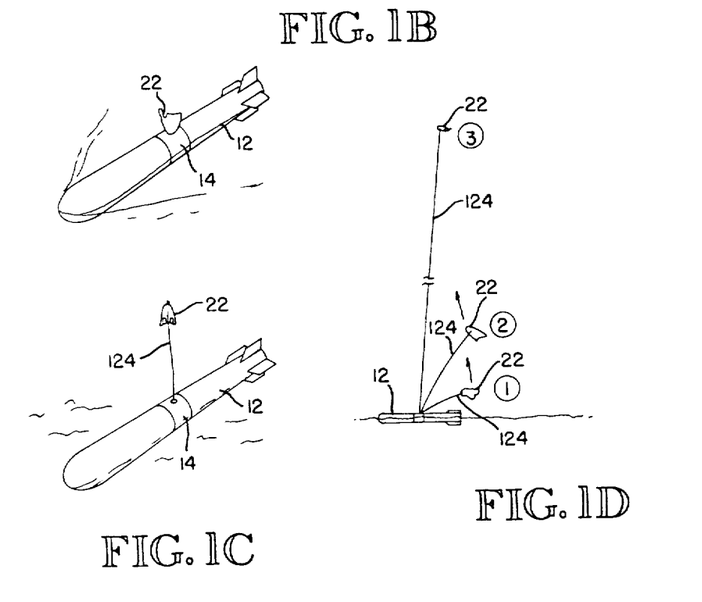

The deployment of the airfoil 22 is shown in the sequence of FIGS. 1A-1D. In FIG. 1A, the lid 136 is shown popping off of the torpedo casing 12 and the airfoil 22 is shown beginning to exit the opened end 24 of the body 18. In FIG. 1B, the airfoil 22 is shown continuing to inflate, and in FIG. 1C the airfoil is shown having fully exited the interior body cavity 20 and pulling the tether line 124 therebehind as it rises.

In FIG. 1D, the airfoil 22 is shown in three positions. The first position shows the airfoil has assumed a buoyantal attitude as wind encounters the airfoil. In the second position, the airfoil is shown after the positive lift of the airfoil when exposed to wind and the helium in the airfoil has caused the airfoil to rise further upward. In the third position the airfoil is shown flying directly above the torpedo with the tether line 124 fully played out.

The airfoil design utilized with the present invention defines a lifting body with a positive lift and wind actually assists in lifting the airfoil to a position directly above the torpedo. If no wind is present, the airfoil will lift upward as a result of the helium within it. It is noted that rather than being blown down by high winds as occurs with conventional balloons and airfoils, the lifting action of the airfoil causes it to assume a position substantially above the object to which the tether line is attached to maximize radar and eye visibility. The airfoil is formed by flexible sheet panels joined together in continuous heat-sealed, gas-tight edge seams and is foldable into a compact size for stowage within the interior body cavity 20. The airfoil is manufactured from sheets of aluminized mylar to provide a metalized surface which is radar reflective. The airfoil is further described in my co-pending application mentioned above, which is incorporated in full herein by reference.

The lid 136 is provided with a centrally located water opening 148 sized to allow exterior water to freely enter the interior body cavity 20 when the torpedo casing is emersed in water. This equals the pressure within the interior body cavity 20 and avoids the air which would otherwise be trapped therein from prematurely popping the lid off the torpedo casing 12. It also allows water to enter into the interior body cavity 20 for selective flooding of the interior of the torpedo casing. The closed body end wall 28 of the body 18 has three circumferentially spaced, selectively operable flood port valve 150 of conventional design, which after a preselected time, will automatically release the water in the interior body cavity into the interior of the torpedo casing for sinking of the torpedo to avoid its recovery by unintended persons.

It will be appreciated that, although specific embodiments of the invention have been described herein for purposes of illustration, various modifications may be made without departing from the spirit and scope of the invention. Accordingly, the invention is not limited except by the appended claims.

I claim:

1. A torpedo recovery unit positionable within a torpedo casing having a circular opening with an annular externally recessed lip for receiving the unit, comprising:

a substantially cylindrical body with an interior cavity substantially diametrically mountable within the torpedo casing, said body having an open end and a distal end closed by an end wall, said body being insertable into the circular opening in the torpedo casing with said body open end at the casing opening and attachable by a flange at said open end to the annular recessed lip of the casing opening to rigidly support the unit within the torpedo casing and to permit access to said interior body cavity, said flange being sized to provide a substantially nonprotruding exterior mounting;

a non-rigid, gas inflatable airfoil foldable within said interior body cavity for deployment therefrom upon inflation, said airfoil having an inflation block;

a substantially cylindrical bottle, containing pressurized gas, and positioned generally coaxial with said body and rigidly and removably attached to an exterior side of said body closed end wall, said bottle having a release valve at an end located toward said body closed end wall for release of the pressurized gas in said bottle upon depression of said release valve;

an elongated valve member positioned generally coaxial with said body and rigidly attached thereto, said valve member having a first end portion extending through a fluid sealed aperture in said body closed end wall and projecting into said interior body cavity, said first end portion having an inflation needle insertable into said inflation block of said airfoil for inflation thereof, said valve member further having a second end portion positioned outside of said body and extending toward said gas bottle and operatively and sealably engaging said release valve when said bottle is attached to said body, said valve member having an interior gas passage extending between said second end portion and said inflation needle at said first end portion with gas flow through said passage being controlled by a solenoid operated valve, said passage to the bottle side being charged with pressurized gas from said bottle upon attachment of said bottle to said body, said solenoid valve being selectively operable to open said passage to allow flow of pressurized gas to said inflation needle for inflation of said airfoil;

a reel positioned within said interior body cavity between said body closed end wall and said airfoil and coaxially mounted on said valve member first end portion, said reel having a tether line wrapped thereabout with one end attached to said airfoil, said reel being substantially free to play out said tether line upon deployment of said airfoil from said interior body cavity under the pulling force applied to said tether line by said airfoil when inflated;

a fully removable lid positioned at said body open end and releasably engaging said body with a substantially flush mounting with the torpedo casing exterior, said lid being outwardly releasable under the force applied to an inward side thereof by said airfoil during inflation, said lid having a water opening to allow exterior water to freely enter said interior body cavity; and a selectively operable flood port valve in said body closed end wall for release of water in said interior body cavity into the interior of the torpedo casing for selective flooding of the torpedo casing.

2. The torpedo recovery unit of claim 1 wherein said valve member first end portion projecting into said interior body cavity has a threaded portion to threadably receive a retainer nut thereon to retain said reel coaxially on said valve member first end portion.

3. The torpedo recovery unit of claim 2 wherein said retainer nut is positioned away from said body closed end wall with a radially inward projecting flange of said reel positioned and rotatably retained therebetween.

4. The torpedo recovery unit of claim 3 further including an attachment nut threadably received on said threaded portion of said valve member first end portion for rigidly attaching said valve member to said body, said attachment nut being positioned between said retainer nut and said body closed end wall radially inward of said reel flange.

5. The torpedo recovery unit of claim 2 wherein said reel has a radially outward opening channel around which said tether line is wound, said channel being defined by a pair of spaced apart radially outward extending circumferential flanges, and wherein said reel further includes a collar circumferentially extending around said channel and attached to a first one of said flanges positioned toward said body closed end wall; said collar extending toward a second one of said flanges positioned away from said body end wall to define a circumferentially extending space between said collar and said second flange through which said tether line may pass as it is played out from said reel.

6. The torpedo recovery unit of claim 1 wherein said body further includes an annular threaded body coupler rigidly attached to said exterior side of said body closed end wall and extending axially toward said bottle to threadably receive an annular threaded bottle coupler rigidly attached to said bottle at said end located toward said body closed end wall to rigidly and removably attach said bottle to said body.

7. The torpedo recovery unit of claim 6 wherein said valve member is positioned within said annular body and bottle couplers.

8. The torpedo recovery unit of claim 1 wherein said body includes a circumferentially extending groove on an interior sidewall at said open end, and said lid has a plurality of spring-loaded balls positioned about its perimeter edge biased outward to engage said groove and releasably retain said lid in place at said body open end.

9. The torpedo recovery unit of claim 8 wherein said body further includes a circumferentially extending stop on said interior sidewall at said open end to engage said lid and prevent inward travel thereof.

10. The torpedo recovery unit of claimn 1 wherein said valve member includes an elongated, generally cylindrical valve body formed of non-ferrous material and threadably receiving at said first valve member end portion a threaded first plug with said inflation needle rigidly attached to an outward side thereof, said valve member interior gas passage including a gas passage in said first plug extending from a centrally positioned seat on an interior endwall communicating with an axially extending interior chamber of said valve body to a gas passage in said inflation needle, said valve member body threadably receiving at said second valve member end portion a threaded second plug with an outward side thereof positioned to operatively depress said bottle release valve to release the pressurized gas in said bottle when said bottle is attached to said body to pressurize said valve body interior chamber, said valve member interior gas passage further including a gas passage in said second plug extending from an off-center opening in an exterior end wall positioned to receive gas from said bottle to an opening in an interior end wall communicating with said valve body interior chamber, said valve member further including a plunger formed of ferrous material slidably mounted within said valve body interior chamber, said plunger having a ball mounted at an end toward said first plug to sealably engage said seat and prevent gas from passing into said first plug gas passage when said plunger is moved into position at said first plug, said plunger being biased toward said first plug to sealably engage said ball with said seat by a resilient member positioned within said valve body interior chamber between said plunger and second plug, said valve member further including a solenoid coil positioned exteriorly about said valve body for selectively applying an electromagnetic force to said plunger for moving said plunger away from said first plug to unseat said ball and permit gas to pass into said first plug gas passage.

11. The torpedo recovery unit of claim 10 wherein said plunger is rised to define exterior passages between said plunger and said valve body interior chamber for the flow of gas around said plunger.

12. The torpedo recovery unit of claim 10 wherein said ball is fabricated of Teflon TM material.

13. A torpedo recovery unit positionable within a torpedo casing having an opening for receiving the unit, comprising:

a body with an interior cavity having an open end mountable within the torpedo casing, said body being insertable into the opening in the torpedo casing with said body open end at the casing opening and being rigidly supportable within the torpedo casing;

a non-rigid, gas inflatable airfoil foldable within said interior body cavity for deployment therefrom upon inflation;

a bottle containing pressurized gas rigidly and removably attached to said body with the torpedo casing, said bottle having a release valve for release of the pressurized gas in said bottle upon depression of said release valve;

a valve member rigidly attached to said body, said valve member having a first end portion extending through an aperture in said body and projecting into said interior body cavity, said first end portion having an inflation needle for inflation of said airfoil, said valve member further having a second end portion positioned outside of said body and operatively and sealably engaging said release valve when said bottle is attached to said body, said valve member having an interior gas passage extending between said second end portion and said inflation needle at said first end portion with gas flow through said passage being controlled by a solenoid operated valve, said passage to the bottle side being charged with pressurized gas from said bottle upon attachment of said bottle to said body, said solenoid valve being selectively operable to open said passage to allow flow of pressurized gas to said inflation needle for inflation of said airfoil, said valve member including an elongated, generally cylindrical valve body formed of non-ferrous material and having at said first valve member end portion a first plug with said inflation needle rigidly attached to an outward side thereof, said valve member interior gas passage including a gas passage in said first plug extending from a centrally positioned seat on an interior endwall communicating with an axially extending interior chamber of said valve body to a gas passage in said inflation needle, said valve member body having at said second valve member end portion a second plug with an outward side thereof positioned to operatively depress said bottle release valve to release the pressurized gas in said bottle when said bottle is attached to said body to pressurize said valve body interior chamber, said valve member interior gas passage further including a gas passage in said second plug extending from an opening in an exterior end wall positioned to receive gas from said bottle to an opening in an interior end wall communicating with said valve body interior chamber, said valve member further including a plunger formed of ferrous material slidably mounted within said valve body interior chamber, said plunger having a ball mounted at an end toward said first plug to sealably engage said seat and prevent gas from passing into said first plug gas passage when said plunger is moved into position at said first plug, said piston being biased toward said first plug to sealably engage said ball with said seat, said valve member further including a solenoid coil for selectively applying an electromagnetic force to said plunger for moving said plunger away from said first plug to unseat said ball and permit gas to pass into said first plug gas passage, a reel positioned within said interior body cavity and coaxially and rotatably mounted on said valve member first end portion, said reel having a tether line wrapped thereabout with one end attached to said airfoil, said reel being substantially free to play out said tether line upon deployment of said airfoil from said interior body cavity under the pulling force applied to said tether line by said airfoil when inflated; and a lid positioned at said body open end and releasably engaging said body, said lid being outwardly opening under the force applied to an inward side thereof by said airfoil during inflation.

* * * * *

UNITED STATES PATENT AND TRADEMARK OFFICE
CERTIFICATE OF CORRECTION

PATENT NO. : 4,717,092

DATED : January 5, 1988

INVENTOR(S) : Robert W. Cameron

It is certified that error appears in the above-identified patent and that said Letters Patent is hereby corrected as shown below:

Column 10, Claim 11, Line 24, delete the word "rised" and substitute therefor --sized--.

Signed and Sealed this

Fourteenth Day of June, 1988

Attest:

DONALD J. QUIGG

*Attesting Officer*  *Commissioner of Patents and Trademarks*